US010295062B2

(12) United States Patent
Poll et al.

(10) Patent No.: US 10,295,062 B2
(45) Date of Patent: May 21, 2019

(54) SEALING ELEMENT FOR SEALING A ROTATING SHAFT

(71) Applicant: Robert Bosch GmbH, Stuttgart (DE)

(72) Inventors: Gerhard Poll, Hannover (DE); Klaus Meyer, Ditzingen (DE); Philipp Marius Schueller, Hannover (DE); Milena Milovanov, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 506 days.

(21) Appl. No.: 14/968,649

(22) Filed: Dec. 14, 2015

(65) Prior Publication Data

US 2016/0169390 A1 Jun. 16, 2016

(30) Foreign Application Priority Data

Dec. 16, 2014 (DE) .................. 10 2014 226 102

(51) Int. Cl.
*F16J 15/32* (2016.01)
*F16J 15/3224* (2016.01)
*F16J 15/16* (2006.01)

(52) U.S. Cl.
CPC ......... *F16J 15/3224* (2013.01); *F16J 15/164* (2013.01)

(58) Field of Classification Search
CPC .. F16J 15/3204; F16J 15/3216; F16J 15/3224; F16J 15/3248; F16J 15/3252; F16J 15/3268
See application file for complete search history.

(56) References Cited

U.S. PATENT DOCUMENTS

| 4,344,631 | A | 8/1982 | Winn | |
|---|---|---|---|---|
| 7,959,157 | B2* | 6/2011 | Dobbs | F16J 15/3224 277/551 |
| 8,950,753 | B2* | 2/2015 | Sedlar | F16J 15/3268 277/559 |
| 9,714,710 | B2* | 7/2017 | Fei | F16J 15/322 |
| 2010/0133758 | A1* | 6/2010 | Kanzaki | B62D 1/16 277/561 |

FOREIGN PATENT DOCUMENTS

| JP | 55-34081 U | 3/1980 |
|---|---|---|
| JP | 7-269713 A | 10/1995 |

* cited by examiner

*Primary Examiner* — Gilbert Y Lee
(74) *Attorney, Agent, or Firm* — Maginot, Moore & Beck LLP

(57) ABSTRACT

A sealing element for sealing a high-pressure side from a low-pressure side at a rotating shaft, in particular in a pump, with a supporting ring configured to be arranged on a stator surrounding the shaft and from which a first annular membrane protrudes facing in the direction toward the shaft. From the first annular membrane, a second annular membrane protrudes facing in the direction toward the shaft. The first annular membrane is formed longer than the second annular membrane as viewed in the axial direction of the shaft, and the second annular membrane is configured with a sealing edge which is to be arranged lying on the shaft.

14 Claims, 1 Drawing Sheet

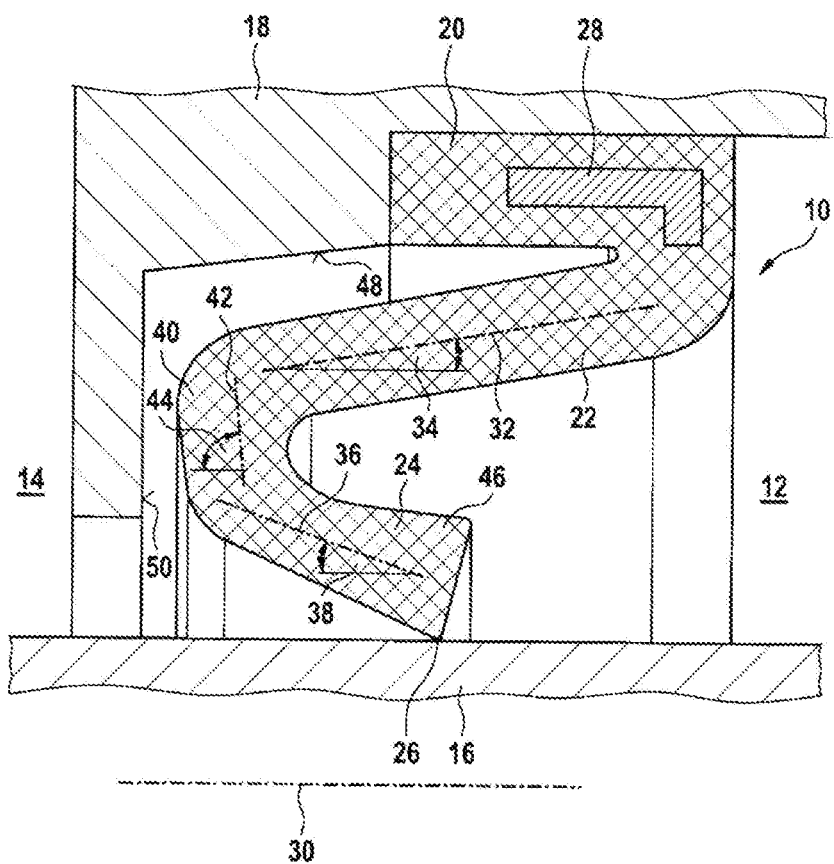

SEALING ELEMENT FOR SEALING A ROTATING SHAFT

This application claims priority under 35 U.S.C. § 119 to patent application no. DE 10 2014 226 102.3, filed on Dec. 16, 2014 in Germany, the disclosure of which is incorporated herein by reference in its entirety.

BACKGROUND

The disclosure concerns a sealing element for sealing a high-pressure side from a low-pressure side at a rotating shaft, in particular in a pump, with a supporting ring which is to be arranged on a stator surrounding the shaft and from which a first annular membrane protrudes facing in the direction toward the shaft.

In particular in pumps, higher requirements are imposed on sealing elements for sealing rotating shafts compared with conventional shaft seals. The reason is mainly that a high pressure predominating on the high-pressure side can change greatly relative to the low pressure on the opposite side of the sealing element, and the pressure relationships of high pressure to low pressure can even sometimes reverse. When a low pressure occurs in a chamber which must otherwise be sealed for high pressure, in conventional shaft seals the sealing membrane lifts away from the shaft. As a result, in particular air can penetrate into the system to be sealed. Under a high positive pressure in the system, the sealing membrane with its sealing edge can be pressed so strongly against the shaft that increased friction losses and increased wear can result.

The consequence may be leaks and a shorter service life of the sealing element with its tribological system.

However, dynamic shaft seals for sealing rotating shafts which, in particular on a change of pressure relationship or on pressure fall, achieve a high sealing effect but only generate low friction losses and which are also formed compactly, are not known.

SUMMARY

According to the disclosure, a sealing element is created for sealing a high-pressure side from a low-pressure side at a rotating shaft, in particular in a pump, with a supporting ring which is to be arranged on a stator surrounding the shaft and from which a first annular membrane protrudes facing in the direction toward the shaft. A second annular membrane protrudes from the first annular membrane facing in the direction toward the shaft, the first annular membrane is formed longer than the second annular membrane viewed in the axial direction of the shaft, and the second annular membrane is configured with a sealing edge which is to be arranged lying on the shaft.

With the solution according to the disclosure, even on system vacuum in the system to be sealed, no penetration or intake of air into the system occurs. Also, with the membrane design according to the disclosure, the tight contact of the sealing edge on the shaft is adapted pressure-dependently. The sealing edge according to the disclosure is thus pressed against the shaft pressure-dependently. On occurrence of both high pressure and low pressure in the system, a sufficient radial force at the sealing edge and consequently a dynamic sealing mechanism is ensured. Furthermore, on a high pressure at the sealing element, the membrane design according to the disclosure reduces the friction losses in the sealed contact compared with conventional seals, and hence the friction load of both the shaft and the sealing element are reduced. In addition, the design of the sealing element according to the disclosure is more compact and hence more space-saving than conventional solutions.

The membranes are elastic, in particular made of an elastomer, such that in conjunction with their deliberate design according to the disclosure, they have particular properties. Thus with two membranes of different lengths in the axial direction, in cross section a Z-shape or concertina shape is produced with which a controlled self-reinforcing support is achieved under high pressure and a secondary pressure attack face is provided under low pressure. The desired contact force of the sealing edge on the shaft is thus retained. Under high pressure, the contact pressure on sealed contact is reduced compared with conventional dynamic seals, and under low pressure, the lifting of the sealing edge is prevented.

On the sealing element according to the disclosure, the first annular membrane is deliberately provided as a pressure-active face at low pressure. Under low pressure, this is drawn in the direction radially toward the shaft. This leads to a force component toward the shaft, by means of which the sealing edge is laid against the shaft. In contrast, under high pressure the second annular membrane causes an axial force component in the opposite direction. Since, because of the different radial lengths according to the disclosure, the pressure-active face of the first membrane is larger than that of the second membrane, a positive balance of forces results in the direction toward the shaft. Under low pressure therefore, the contact of the sealing edge on the shaft is guaranteed and the radial force necessary for dynamic and static sealing is maintained. Lifting of the sealing edge is thus suppressed.

By the ratio of the membrane lengths in the axial direction and in addition advantageously also the membrane thicknesses, the sealing system according to the disclosure can be adapted to particular operating conditions such as pressure gradients, pressure maxima and minima, in relation to the radial forces under high pressure and low pressure and in pressureless state.

The supporting ring of the sealing element according to the disclosure is advantageously formed with an elastomer ring and a stiffening ring connected stationarily thereto. The stiffening ring contributes positively to establishing a stationary starting position of the sealing element according to the disclosure. The stiffening ring is preferably injection-molded or vulcanized into the supporting ring. The stiffening ring is preferably made of metal, in particular a thin-walled plate.

The first annular membrane is preferably formed integrally with the supporting ring, and in particular the second annular membrane is formed integrally with the first annular membrane. This guarantees a high tightness of the membrane arrangement according to the disclosure.

Furthermore, viewed in longitudinal section relative to the axial direction of the associated shaft, the first annular membrane is oriented at an angle between 5° and 15°, in particular between 8° and 12°, particularly preferably 10°. Moreover, viewed in longitudinal section relative to the axial direction of the associated shaft, the first annular membrane preferably extends from radially outside to radially inside, from the high-pressure side to the low-pressure side. Such an orientation of the first annular membrane supports the effects cited above.

Viewed in longitudinal section relative to the axial direction of the associated shaft, the second annular membrane is oriented at an angle between 15° and 25°, in particular between 18° and 22°, particularly preferably 20°. Viewed in longitudinal section relative to the axial direction of the associated shaft, the second annular membrane extends preferably from radially inside to radially outside, from the high-pressure side to the low-pressure side. Such an orientation of the second annular membrane also supports the effects cited above.

To refine said effects further, the second annular membrane is advantageously formed with a thickening in the region of the sealing edge formed thereon.

Preferably a first support face is formed on the associated stator radially outside of the first annular membrane relative to the axial direction of the associated shaft, on the low-pressure side. When high pressure occurs, the first membrane is pressed onto this support face. Thus the pressure-active surface area of the second membrane is reduced. Simultaneously, an increase in radial force caused by high pressure on the sealing edge on the second membrane is reduced or compensated.

Preferably, a second support face is formed on the associated stator axially outside of a transition between the first annular membrane and the second annular membrane relative to the axial direction of the associated shaft, on the low-pressure side. Under high pressure, the second support face limits the freedom of movement of the transition between the first membrane and the second membrane in the axial direction. This also reduces the active surface area of the second membrane and thus achieves the effects cited above. By means of the position and distance of the supporting face from the membranes in pressureless state, the movement of the sealing element according to the disclosure under high pressure can be limited. Furthermore, the pressure-active surface area of the radially inner second annular membrane can be influenced.

The solution according to the disclosure is particularly suitable for injection systems of petrol or diesel engines and turbines, for hydraulic pumps, engine oil pumps, transmission oil pumps, water pumps, feed fluid pumps, procedure and process engineering pumps e.g. in the foodstuff and pharmaceutical industries and pumps for delivering cooling lubricants and refrigerants, and pumps for driving dynamic and driver assistance systems (ABS, ESP, etc.).

BRIEF DESCRIPTION OF THE FIGURES

An exemplary embodiment of the solution according to the disclosure is explained in more detail below with reference to the attached diagrammatic drawing. The FIGURE shows a longitudinal section of one exemplary embodiment of a sealing element according to the disclosure.

DETAILED DESCRIPTION

A sealing element 10 shown in the FIGURE is provided for sealing a high-pressure side 12 from a low-pressure side 14 at a rotating shaft 16 of a hydraulic pump, not shown in more detail. The sealing element 10 is held stationarily on a stator 18 belonging to the hydraulic pump by means of a supporting ring 20 of substantially rectangular longitudinal section. Radially inside relative to the shaft 16, the supporting ring 20 carries a first annular membrane 22 and further radially inward, a second annular membrane 24. On the second annular membrane 24, radially on the inside, a sealing edge 26 is formed which lies on the shaft 16. The supporting ring 20, membrane 22, membrane 24 and sealing edge 26 are formed of one piece or integrally from an elastomer in a vulcanizing process. A stiffening ring 28 is also vulcanized into the supporting ring 20 for reinforcement.

Viewed in the longitudinal section shown relative to an axial direction 30 of the shaft 16, a main orientation 32 of the first annular membrane 22 extends at an angle 34 of 10° from radially outside to radially inside, from the high-pressure side 12 to the low-pressure side 14. Furthermore, in the longitudinal section shown relative to the axial direction 30, a main orientation 36 of the second annular membrane 24 extends at an angle 38 of 20° from radially inside to radially outside, from the high-pressure side 14 to the low-pressure side 12.

Viewed in the axial direction of the shaft 16 or in the axial direction 30, the first annular membrane 22 is formed longer than the second annular membrane 24.

Between the two membranes 22 and 24 is an equally annular transition 40, the main orientation 42 of which, relative to the axial direction 30, runs at an angle 44 of 85° from radially inside to radially outside, from the high-pressure side 14 to the low-pressure side 12.

Furthermore, in the radially outer region of the sealing edge 26 formed thereon, the second annular membrane 24 has a thickening 46 by means of which the region of the sealing edge 26 is slightly stiffened in comparison with the membrane 24.

In relation to the axial direction 30 of the shaft 16, radially on the outside of the first annular membrane 22 on the low-pressure side 14, a first support face 48 is formed on the stator 18, on which the first membrane 22 can rest under a high positive pressure on the high-pressure side 12. In addition, relative to the axial direction 30 of the shaft 16, axially on the outside of the transition 40 between the first annular membrane 22 and the second annular membrane 24, a second support surface 50 is formed on the stator 18 on the low-pressure side 14. The transition 40 can then lie and be supported on this support face 50 under a high positive pressure.

What is claimed is:

1. A sealing element for sealing a high-pressure side from a low-pressure side at a rotating shaft comprising:
 a supporting ring configured to be arranged on a stator surrounding the shaft;
 a first annular membrane protruding from the supporting ring, the first annular membrane facing in a direction toward the shaft;
 a second annular membrane protruding from the first annular membrane, the second annular membrane facing in the direction toward the shaft, and the second annular membrane including a sealing edge configured to be arranged lying on the shaft,
 wherein the first annular membrane is formed longer in an axial direction of the shaft than each of the supporting ring and the second annular membrane,
 wherein a first support surface is formed on the stator radially outside of the first annular membrane relative to the axial direction of the shaft, on the low-pressure side,
 wherein a second support face is formed on the stator axially on an outside of a transition between the first annular membrane and the second annular membrane relative to the axial direction of the shaft, on the low-pressure side, and
 wherein the first annular membrane has an outer circumferential surface and, under at least one pressure condition, the outer circumferential surface is configured to be pressed onto the first support surface and the transition is configured to be pressed onto the second support face.

2. The sealing element according to claim 1, wherein the supporting ring is formed with an elastomer ring and a stiffening ring connected stationarily thereto.

3. The sealing element according to claim 1, wherein:
the first annular membrane is formed integrally with the supporting ring, and
the second annular membrane is formed integrally with the first annular membrane.

4. The sealing element according to claim 1, wherein as viewed in longitudinal section relative to the axial direction of the shaft, the first annular membrane is oriented at an angle between 5° and 15°.

5. The sealing element according to claim 1, wherein as viewed in longitudinal section relative to the axial direction of the shaft, the first annular membrane extends from radially outside to radially inside, from the high-pressure side to the low-pressure side.

6. The sealing element according to claim 1, wherein as viewed in longitudinal section relative to the axial direction of the shaft, the second annular membrane is oriented at an angle between 15° and 25°.

7. The sealing element according to claim 1, wherein as viewed in longitudinal section relative to the axial direction of the shaft, the second annular membrane extends from radially inside to radially outside, from the high-pressure side to the low-pressure side.

8. The sealing element according to claim 1, wherein the second annular membrane includes a thickening in a region of the sealing edge.

9. The sealing element according to claim 1, wherein the first annular membrane extends axially beyond the supporting ring on the low-pressure side.

10. The sealing element according to claim 1, wherein:
the at least one pressure condition is a high-pressure condition in which a pressure on the high-pressure side is higher than a pressure on the low-pressure side, and
a radial force on the sealing edge as a result of the high-pressure condition is compensated by the contact between (i) the first annular membrane and the first support surface and (ii) the transition and the second support face.

11. The sealing element according to claim 1, wherein the first annular membrane generates a force component toward the shaft under a low-pressure condition in which a pressure on the high-pressure side is lower than a pressure on the low-pressure side, the force component configured to press the sealing edge onto the shaft under the low-pressure condition.

12. The sealing element according to claim 11, wherein the first annular membrane has a pressure-active face on the high-pressure side that is drawn in the direction radially toward the shaft under the low-pressure condition.

13. The sealing element according to claim 1, wherein, in the axial direction of the shaft, the first annular membrane has a first length, the second annular membrane has a second length, and the supporting ring has a third length, the first, second, and third lengths defined between axially-outermost surfaces of each of the first annular membrane, the second annular membrane, and the supporting ring, respectively.

14. The sealing element according to claim 13, wherein the first annular membrane and the supporting ring share the same axially-outermost surface on the high-pressure side of the sealing element.

* * * * *